United States Patent [19]

Sano

[11] 4,162,091

[45] Jul. 24, 1979

[54] WHEEL SUSPENSION APPARATUS FOR A VEHICLE

[75] Inventor: Shoichi Sano, Tokorozawa, Japan

[73] Assignee: Honda Giken Kogyo Kabushiki Kaisha, Tokyo, Japan

[21] Appl. No.: 858,459

[22] Filed: Dec. 7, 1977

[30] Foreign Application Priority Data

Dec. 14, 1976 [JP] Japan ................. 51-150230

[51] Int. Cl.² ........................................... B60G 11/26
[52] U.S. Cl. ................................................. 280/702
[58] Field of Search ............... 267/11, 11 A; 280/702

[56] References Cited

U.S. PATENT DOCUMENTS

| | | | |
|---|---|---|---|
| 3,563,566 | 2/1971 | Weber | 280/702 |
| 3,589,933 | 6/1971 | Pitcher | 280/702 |

*Primary Examiner*—Richard A. Bertsch
*Attorney, Agent, or Firm*—Haseltine, Lake & Waters

[57] ABSTRACT

A wheel suspension apparatus for a vehicle of the strut type, comprising a hydraulic damper disposed between the body and a wheel of the vehicle and including an inner cylinder and an outer cylinder slidably fitted thereover to define a main hydraulic chamber; an auxiliary cylinder is slidably fitted over the outer peripheral surface of the outer cylinder to define an auxiliary hydraulic chamber therebetween in communication with the main chamber, said auxiliary cylinder is urged in one axial direction under the hydraulic pressure in said third hydraulic chamber. A suspension coil spring is disposed under compression between the auxiliary cylinder and the outer cylinder for resiliently biasing the former in the other axial direction. The apparatus affords a freedom in designing the coil spring particularly in respect of the disposition space, length and diameter thereof in accordance with specific conditions required. The apparatus further includes a vehicle-height adjusting valve for adjusting the length of the damper to a predetermined constant level.

6 Claims, 1 Drawing Figure

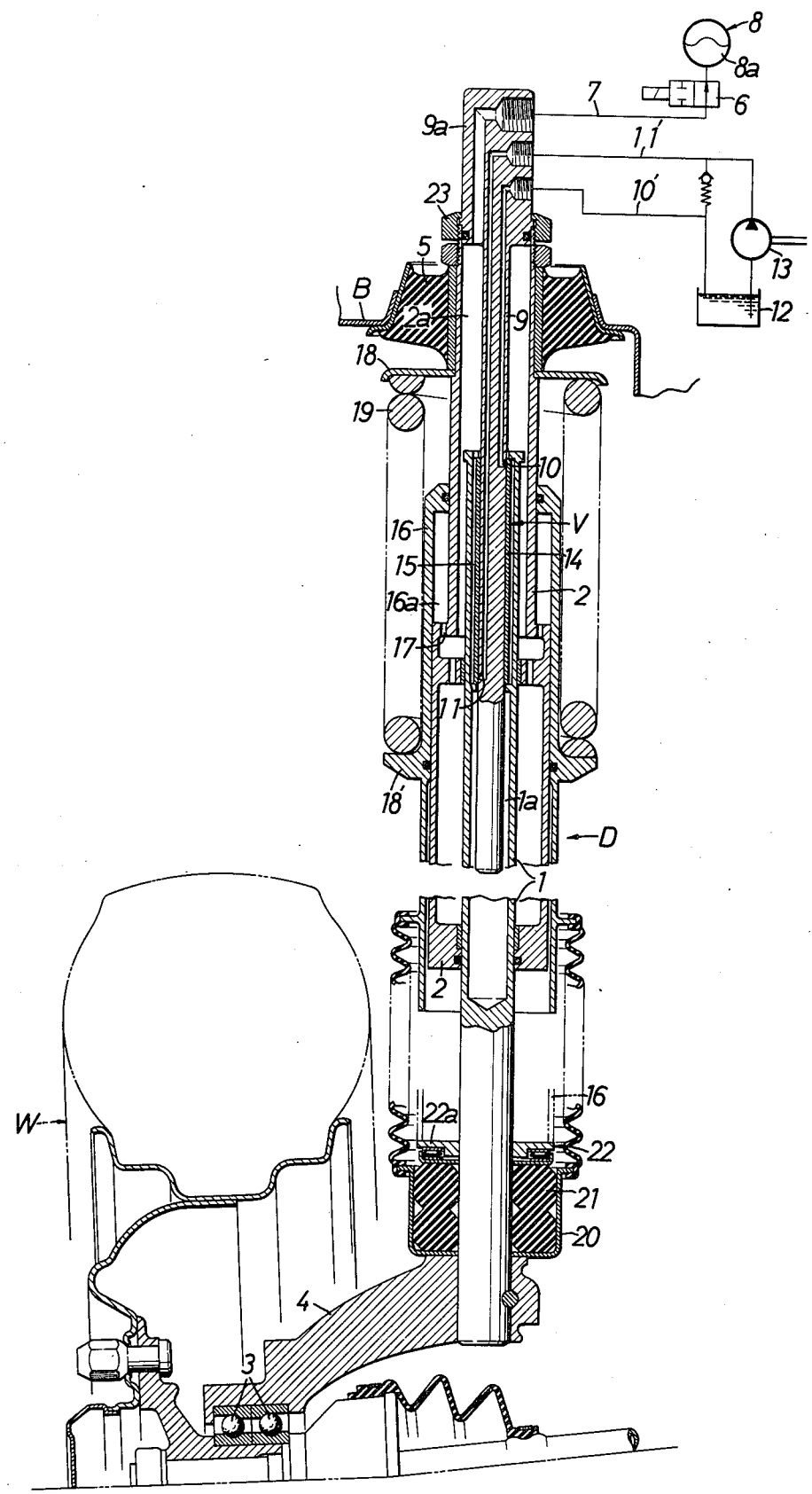

WHEEL SUSPENSION APPARATUS FOR A VEHICLE

BACKGROUND OF THE INVENTION

1. Field of the Invention

The present invention relates to a wheel suspension apparatus for a vehicle of the so-called strut type, in which wheels are each connected to a vehicle body through a hydraulic damper composed of mutually slidably associated inner and outer cylinders, and a suspension coil spring is retained in an outer periphery of the hydraulic damper.

2. Description of the Prior Art

In the past, a suspension coil spring employed in the suspension apparatus as described must have an expansion stroke equal to that of a hydraulic damper since the coil spring is compressibly retained between the inner and outer cylinders of the hydraulic damper. As a consequence, freedom in designing the suspension coil spring decreases, which depending on vehicles, often results in a limitation of area in space around the hydraulic damper, shape thereof and the like, in addition to a difficulty of mounting the suspension coil spring on the hydraulic damper.

SUMMARY OF THE INVENTION

It is therefore an object of the present invention to provide a suspension apparatus of the type as described above, which can freely select the expansion stroke of the suspension coil spring without being restrained by the expansion stroke of the hydraulic damper so as to greatly increase the freedom in designing the suspension coil spring so that it may be easily applied to various kinds of vehicles.

BRIEF DESCRIPTION OF THE DRAWING

In the drawing, the single FIGURE is a vertical section showing one embodiment of apparatus in accordance with the present invention.

DESCRIPTION OF THE PREFERRED EMBODIMENT

Turning now to the FIGURE, which illustrates one embodiment of the present invention, there is shown a hydraulic damper D including an inner cylinder 1 and an outer cylinder 2 slidably fitted thereover to define a main hydraulic chamber which is constituted by a pair of hydraulic chambers 1a and 2a respectively defined in the inner and outer cylinders. The inner cylinder 1 is connected to a knuckle 4 which rotatably supports a steerable road wheel W through bearings 3, whereas the outer cylinder 2 is connected to a vehicle body B through a resilient support member 5. The hydraulic chamber 2a in the outer cylinder 2 is connected to a pressure receiving chamber 8a for a suspension gas spring 8 through an oil passage 7 provided with a solenoid valve 6. The solenoid valve 6 is opened and closed by an instruction device not shown and normally held in its open position.

A core rod 9, which downwardly extends into the hydraulic chamber 1a in the inner cylinder 1, has an enlarged end 9a detachably fastened by a nut 23 to the upper end of the outer cylinder 2, the rod 9 having a low and a high pressure port 10 and 11 opened in the outer peripheral surface thereof at positions axially spaced from each other. The low pressure port 10 is in communication with an oil reservoir 12 through a low pressure flow passage 10' whereas the high pressure port 11 is in communication with a discharge port of a source of hydraulic pressure such as a hydraulic pump 13 through a high pressure flow passage 11'. On the inner wall of the inner cylinder 1 against axial movement relative thereto is mounted a cylindrical valve body 14 which is slidably fitted over the core rod 9 to control opening and closing of the ports 10 and 11. The valve body 14 has an annular oil passage 15 formed between the outer periphery thereof and the interior wall of the inner cylinder 1 to provide a communication between the hydraulic chambers 1a and 2a in the inner and outer cylinders 1 and 2. The valve body 14 cooperates with the ports 10 and 11 to constitute a vehicle-height adjusting valve V for adjusting the length of the hydraulic damper D to a constant level.

Slidably fitted over the outer cylinder 2 is an auxiliary cylinder 16 which is internally formed with an auxiliary hydraulic chamber 16a in communication with the hydraulic chamber 2a through a hole 17 to exert pressure therefrom on the auxiliary cylinder 16 so that the latter may be moved upward. The outer cylinder 2 and the auxiliary cylinder 16 have a pair of vertically opposed spring seats 18 and 18', respectively, integrally formed in the outer peripheries thereof, between which a suspension coil spring 19 is compressively retained to bias the auxiliary cylinder 16 downwardly.

Mounted on the lower end of the inner cylinder 1 is a cup body 20 into which is accommodated a damping member 21 formed of elastic material such as rubber. A thrust bearing 22 is placed on the damping member 21 in overlapping relation, with a race 22a thereof being arranged on the top of the thrust bearing 22 in facing opposite relation with the lower end of the auxiliary cylinder 16.

Although not shown in the drawing, well-known attenuation mechanisms are each disposed in the communication passage between the hydraulic chamber 2a in the outer cylinder 2 and the pressure receiving chamber 8a for the suspension gas spring 8 and also in the communication passage between the hydraulic chamber 2a in the outer cylinder and the hydraulic chamber 16a in the auxiliary cylinder 16.

The operation of the aforementioned embodiment will now be described.

First, the adjustment of vehicle height and the steering operation will be discussed. When the vehicle height is held in a predetermined standard level, both the low and high pressure ports 10 and 11 are simultaneously closed by the valve body 14 as shown to shut off the interior of the hydraulic damper D from either of the hydraulic pump 13 and the oil reservoir 12, and at this time, a downward load applied from the body B to the hydraulic damper D exerts on the suspension gas spring 8 and suspension coil spring 19 through oil within the hyraulic chambers 1a, 2a and 16a.

When a steering mechanism not shown is operated to rotate the knuckle 4 about the hydraulic damper D, the inner and outer cylinders 1 and 2 are merely relatively rotated but the relative position between the outer cylinder 2 and the auxiliary cylinder 16 remains unchanged, and hence, no torisonal force is exerted on the coil spring 19, as a consequence of which the steerable wheel W may be turned smoothly.

When the load imposed on the hydraulic damper D increases as occupants or cargoes increase, the outer cylinder 2 moves down relative to the inner cylinder 1 to lower the vehicle height, and at the same time, the core rod 9 moves down to move the high pessure port 11 downwardly of the valve body 14 into communication with the hydraulic chamber 1a. As a consequence, pressure oil discharged from the hydraulic pump 13 flows into the hydraulic chamber 1a through the high pressure port 11 and further flows into the hydraulic chamber 2a through the oil passage 15 so that the outer cylinder 2 moves up relative to the inner cylinder 1, that is, the hydraulic damper D elongates. Then, when the high pressure port 11 is again closed by the valve body 14, supply of pressure oil thereto is shut off, with the result that the damper D is no longer elongated, whereby the lowered vehicle height can be adjusted to the standard level.

Conversely, when the outer cylinder 2 moves up as the load decreases to increase the vehicle height, the core rod 9 moves up at the same time to move the low pressure port 10 upwardly of the valve body 14 into communication with the hydraulic chamber 2a. As a consequence, pressure oil from the hydraulic chamber 2a flows into the low pressure port 10 and is discharged into the oil reservoir 12 so that the outer cylinder 2 moves down relative to the inner cylinder 1, that is, the damper D contracts. Then, when the low pressure port 10 is again closed by the valve body 14, the damper D is no longer contracted, whereby the elevated vehicle height is returned to the standard level.

Next, the damping action will be described. When the steerable road wheel W is vibrated up and down on the road surface during the travelling, the inner cylinder 1 vibrates up and down with the steerable road wheel W, and when moved up, the pressure within the pressure receiving chamber 8a increases to compress the gas spring 8 and at the same time the pressure within the hydraulic chamber 16a increases to move the auxiliary cylinder 16 upwardly and to also compress the coil spring 19, whereas when the inner cylinder 1 is moved down, the operation reverse to the former is effected, whereby an impact force from the road surface may be absorbed. During that time, the low and high pressure ports 10 and 11 are alternately opened by the valve body 14 vertically vibrating with the inner cylinder 1. However, such as opening time is very short and flow passage resistance of the ports 10, 11 and flow passages 10',11' adjacent thereto is high and therefore, the vehicle-height adjusting operation as described above remains as if it was not effected.

Incidentally, where the gas spring 8 and the coil spring 1 are in cooperation with each other as previously mentioned, the combined spring constant of the aforementioned springs becomes smaller than the respective spring constants and consequently, the damping action becomes softened, in which case, the relationship between the load and the damping stroke is represented by a non-linear characteristic. In this case, it is comfortable to ride in, generally, but when travelling on a bad road or when travelling at high speeds, the vehicle body becomes unstabilized in posture, resulting in a lowering of maneuvering stability. To overcome this, the solenoid valve 6 is closed by a signal from the instruction device not shown, and as a consequence, the gas spring 8 is held in a locked state and only the coil spring 19 is operated. In this case, the spring constant thereof is larger then the abovementioned combined spring constant, in which case, therefore, the damping action becomes hardened and hence the relationship between the load and the damper stroke is represented by a linear characteristic whereby the vehicle body B may be effectively prevented from being unstabilized in posture.

In the following, considerations will be taken of expansion strokes in the hydraulic damper D and the coil spring 19 when the solenoid valve 6 is closed. Let a represent the sectional area of the inner cylinder 1, A the sectional area of the pressure receiving chamber 16a, l the expansion stroke of the damper D (i.e., the axial relative displacement between the inner and outer cylinders 1 and 2), and L the expansion stroke of the coil spring 19 (i.e., the axial relative displacement between the outer and auxiliary cylinders 2 and 16), then the quantity of oil in all hydraulic chambers 1a, 2a, and 16a is constant, it is possible to write, $$L \cdot A = l \cdot a$$

thus, $$L/l = a/A$$

As is apparent from the above, in designing, the sectional area a of the inner cylinder 1 and the sectional area A of the pressure receiving chamber 16a may suitably be selected to thereby freely determine the expansion stroke L of the coil spring 19 independently of the expansion stroke of the damper D.

Thus, in accordance with the present invention, it is possible to employ a suspension coil spring suited to an area in space around the hydraulic damper, shape thereof and the like. For example, where the space exclusively occupied by the suspension coil spring is wide in a radial direction and narrow in an axial direction, the stroke of the spring may be made shorter than that of the damper to thereby employ a large-diameter and short suspension coil spring without decreasing up and down stroke of the wheel. Conversely, where the space occupied by the suspension coil spring is narrow in a radial direction and wide in an axial direction, the stroke of the spring may be increased to thereby employ a small-diameter and long suspension coil spring.

Next, for example, in the event that a trouble occurs in which oil within the hydraulic damper D flows outside due to failure or damage of the oil passage 7, high pressure flow passage 11', etc., the auxiliary cylinder 16 is moved down by the force of the coil spring 19 as the pressure in the hydraulic chamber 16a decreases so that the lower end of the auxiliary cylinder 16 is brought into abutment with the top race 22a of the thrust bearing 22 as indicated by the dash-dotted contour lines and the impact force then exerted on the thrust bearing 22 is absorbed by the damping member 21 located thereunder. In this manner, when the auxiliary cylinder 16 comes into contact with the thrust bearing 22, the coil spring 19 still functions as a suspension spring in a state retained between the outer cylinder 2 and the inner cylinder 1, that is, the spring expands and contracts as the wheel W vibrates up and down to absorb the impact force thereof. In steering, relative rotation between the auxiliary cylinder 16 and the knuckle 4 may be smoothly effected by the action of the thrust bearing 22, whereby the steerable road wheel W may be turned lightly in a manner similar to the usual case.

Though only a single embodiment of the present invention has been shown and described, it will be apparent to those skilled in the art that various changes and modifications may be made therein without departing from the spirit of the invention or the scope of the appended claims.

What is claimed is:

1. A wheel suspension apparatus for a vehicle comprising a hydraulic damper disposed between the body and a wheel of the vehicle and including an inner cylinder and an outer cylinder slidably fitted thereover to define a main hydraulic chamber; an auxiliary cylinder slidably fitted over the outer peripheral surface of said outer cylinder to define an auxiliary hydraulic chamber therebetween in communication with said main chamber, said auxiliary cylinder being urged in one axial direction under the hydraulic pressure in said auxiliary chamber; and a suspension coil spring disposed under compression between said auxiliary cylinder and said outer cylinder for resiliently biasing the former in the other axial direction.

2. A wheel suspension apparatus for a vehicle as claimed in claim 1, comprising a suspension gas spring having a pressure receiving chamber in communication with said main chamber by way of a communication passage, said passage incorporating therein a switching valve for opening and closing thereof.

3. A wheel suspension apparatus for a vehicle as claimed in claim 2, wherein said main chamber includes a first chamber in said inner cylinder communicating with said auxiliary chamber and a second chamber in said outer cylinder communicating with said first chamber, and a core rod connected with said outer cylinder and extending therefrom into said first chamber, said rod having a high pressure port and a low pressure port formed at its periphery in axially spaced relation with each other, said high and low pressure ports being in communication with a source of hydraulic pressure and a reservoir, respectively, and a cylindrical valve slidably fitted over said core and secured to said inner cylinder for controlling communication of said ports with said first and second chambers, said high pressure port being normally out of communication with said first and second chambers and placed into communication with said first chamber when said inner and outer cylinders are contracted relative to each other less that a prescribed relative length, said low pressure port being also normally out of communication with said first and second chambers and placed into communication with said second chamber when said inner and outer cylinders are extended relative to each other in excess of a prescribed relative length.

4. A wheel suspension apparatus for a vehicle as claimed in claim 1, wherein said auxiliary cylinder is urged outwardly in the direction away from said outer cylinder under the hydraulic pressure in said auxiliary chamber, and said inner cylinder is provided with stopper means for stopping the outward movement of said auxiliary cylinder at a fixed position when hydraulic pressure in said main chamber is abnormally decreased.

5. A wheel suspension apparatus for a vehicle as claimed in claim 4, wherein said stopper means comprises a cup body mounted on one end of said inner cylinder, a damping member retained in said cup body, and a thrust bearing disposed on the top of said damping member in opposed relation to one end of said auxiliary cylinder.

6. A wheel suspension apparatus for a vehicle as claimed in claim 1, wherein said main chamber includes a first chamber in said inner cylinder communicating with said auxiliary chamber and a second chamber in said outer cylinder communicating with said first chamber, and a core rod connected with said outer cylinder and extending therefrom into said first chamber, said rod having a high pressure port and a low pressure port formed at its periphery in axially spaced relation with each other, said high and low pressure ports being in communication with a source of hydraulic pressure and a reservoir, respectively, and a cylindrical valve slidably fitted over said core rod and secured to said inner cylinder for controlling communication of said ports with said first and second chambers, said high pressure port being normally out of communication with said first and second chambers and placed into communication with said first chamber when said inner and outer cylinders are contracted relative to each other less than a prescribed relative length, said low pressure port being also normally out of communication with said first and second chambers and placed into communication with said second chamber when said inner and outer cylinders are extended relative to each other in excess of a prescribed relative length.

* * * * *